United States Patent [19]
Sommer

[11] Patent Number: 5,487,458
[45] Date of Patent: Jan. 30, 1996

[54] ELECTRICALLY ENERGIZED OIL SHEAR DRIVE SYSTEM

[75] Inventor: Gordon M. Sommer, Grosse Pointe Farms, Mich.

[73] Assignee: Midwest Brake Bond Company, Warren, Mich.

[21] Appl. No.: 148,197

[22] Filed: Nov. 3, 1993

[51] Int. Cl.$^6$ .................................................. F16D 67/06
[52] U.S. Cl. ...................... 192/18 B; 192/90; 192/113.23
[58] Field of Search ................................ 192/18 R, 18 A, 192/18 B, 12 D, 90, 113.23

[56] References Cited

U.S. PATENT DOCUMENTS

| | | |
|---|---|---|
| 1,623,349 | 4/1927 | Knutsen . |
| 2,659,830 | 11/1953 | Mason et al. . |
| 3,089,574 | 5/1963 | Howard . |
| 3,123,193 | 3/1964 | Marland .............................. 192/18 B |
| 3,268,047 | 8/1966 | Grygera et al. . |
| 3,319,748 | 5/1967 | Joyce, Jr. . |
| 3,352,396 | 11/1967 | Moseley ............................ 192/18 B X |
| 3,379,292 | 4/1968 | Grygera . |
| 3,487,438 | 12/1969 | Becker et al. . |
| 3,494,450 | 2/1970 | Mankowsky et al. . |
| 3,614,999 | 10/1971 | Sommer . |
| 3,687,250 | 8/1972 | James et al. . |
| 3,696,898 | 10/1972 | Sommer . |
| 3,713,517 | 1/1973 | Sommer . |
| 3,750,786 | 8/1973 | Toyohama et al. . |
| 4,067,427 | 1/1978 | Cackley . |
| 4,096,931 | 6/1978 | Whitehurst . |
| 4,135,611 | 1/1979 | Spanke . |
| 4,183,425 | 1/1980 | Sommer . |
| 4,346,796 | 8/1982 | Ueno . |
| 4,432,443 | 2/1984 | Sommer . |
| 4,552,255 | 11/1985 | Sommer . |
| 4,577,738 | 3/1986 | Yater . |
| 4,580,674 | 4/1986 | Weber . |
| 4,607,736 | 8/1986 | Kelley . |
| 4,643,282 | 2/1987 | Edl . |
| 4,693,350 | 9/1987 | Sommer . |
| 4,982,825 | 1/1991 | Sekella . |
| 5,172,798 | 12/1992 | Mabee ................................... 192/18 B |
| 5,285,879 | 2/1994 | Sommer ............................ 192/18 B X |
| 5,291,977 | 3/1994 | Sommer ................................ 192/18 B |

FOREIGN PATENT DOCUMENTS

| | | |
|---|---|---|
| 57-86643 | 5/1982 | Japan . |
| 1437609 | 6/1976 | United Kingdom . |

Primary Examiner—Richard M. Lorence
Attorney, Agent, or Firm—Harness, Dickey & Pierce

[57] ABSTRACT

A drive system has an input shaft and an output shaft. An oil shear clutch assembly is operable to lock the input shaft to the output shaft and an oil shear brake assembly is operable to lock the output shaft to the housing of the drive system. The clutch assembly is normally engaged and the brake assembly is normally applied due to the force being exerted by a first and second plurality of coil springs. Power supplied to a first AC coil will disengage the clutch and power supplied to a second AC coil will release the brake. The drive system will therefore act as a braking system when power is terminated to the drive system.

12 Claims, 1 Drawing Sheet

ELECTRICALLY ENERGIZED OIL SHEAR DRIVE SYSTEM

FIELD OF THE INVENTION

The present invention relates to press drives. More particularly, the present invention relates to a new and improved press drive which utilizes a brake and a clutch for operating of the drive system with the drive system acting as a motor brake when power is terminated to the drive system.

BACKGROUND OF THE INVENTION

Drive systems incorporating clutches and brakes are known well in the art and have been used successfully for many years. The prior art designs of drives experienced problems with the braking and clutching systems as well as problems with the overall lubrication of the components of the drive. These prior art designs of drives utilize a plurality of dry friction plates to hold and/or release the various members of the drive system. Due to the wear between these friction plates, the drives require constant adjustment and replacement of the clutch and brake assemblies. Also, during the operation of these dry clutch and brake assemblies, a significant amount of heat is generated. This generation of heat combined with the excessive wear of the friction plates causes fading of the prior art brake and/or clutch assemblies. In addition to the problems of excessive heat generation and excessive wear of the prior art clutch and brake assemblies is the problem associated with supplying an adequate amount of lubrication to the various components of the drive system.

Oil shear brakes and clutches have been developed to overcome the problems associated with the earlier designs of drives incorporating dry friction plate brakes and clutches. In an oil shear clutch or brake system, over 90% of the start/stop inertia is absorbed by a thin, but positive oil film between the friction plates. This thin oil film thus results in little or no wear between the plates and also little or no fading of the clutch and/or brake assemblies. The thin oil film between the friction plates also operates to remove the heat generated during the stop/start cycles of the press. With the removal or elimination of the generated heat from the friction plates, there is no longer a practical limit on the drive trip rate or speed. The oil shear brake and clutch assemblies also eliminates the problems associated with lubrication of the various components of the drive as the drive housing is now filled with lubricating oil for the oil shear brake and clutch assemblies.

Drive systems incorporating oil shear brake and clutch assemblies have enjoyed wide acceptance in the drive system market. The continued development of these drive assemblies is directed towards providing a more compact and lower cost drive without sacrificing the performance characteristics of the drive system.

SUMMARY OF THE PRESENT INVENTION

The present invention provides the art with a drive system which utilizes one oil shear clutch assembly and one oil shear brake assembly. The drive system of the present invention is positioned between a driving means and a driven apparatus. The present invention provides for braking of the apparatus independent of the driving means and braking of the driving means utilizing the one clutch and one brake assembly of the drive system. The drive system provides the braking of the driving means when power is terminated to the drive system.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
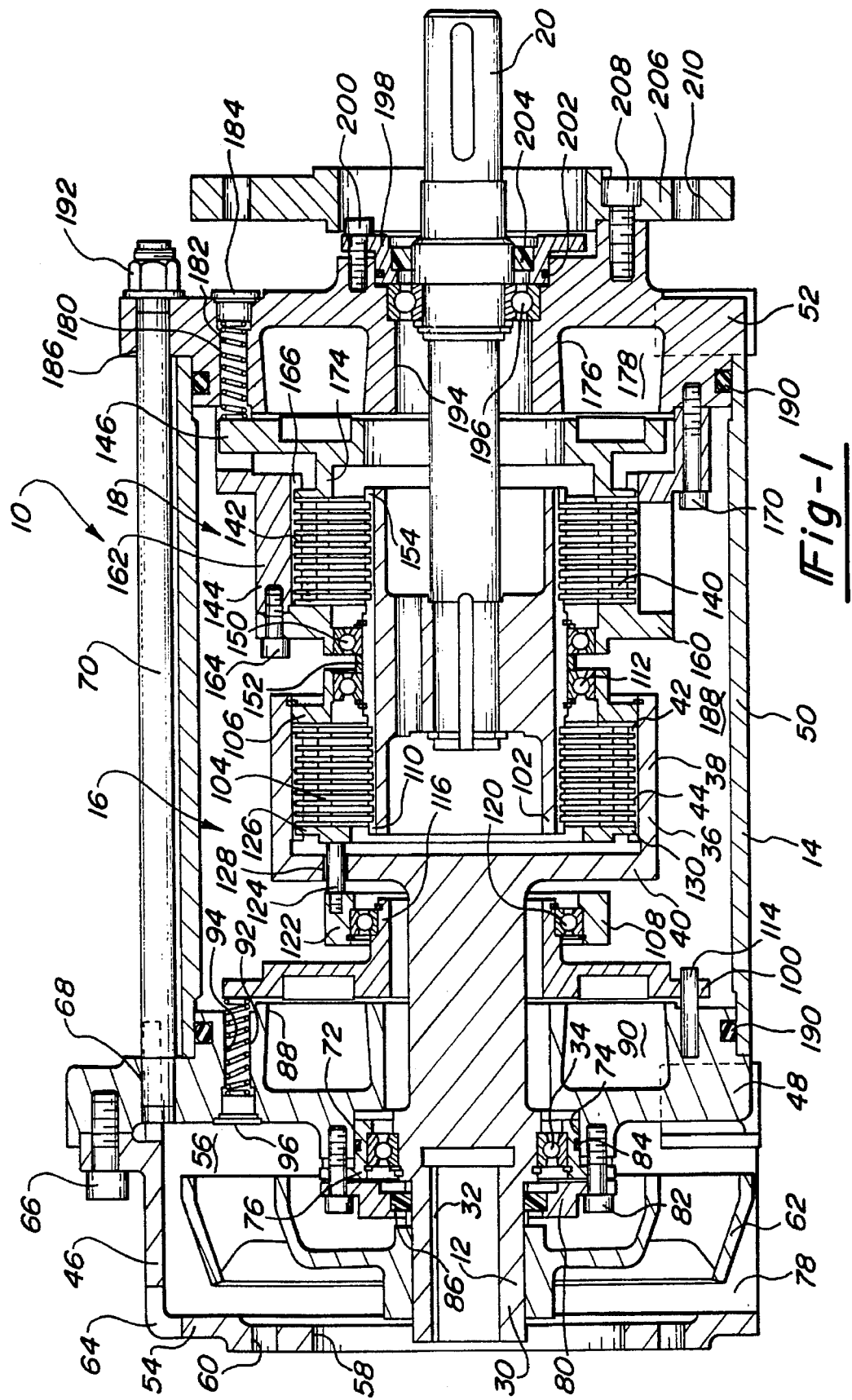
FIG. 1 is a side elevational view partially in cross section of a drive system according to the present invention.

Referring now to the drawing, there is shown in FIG. 1, a drive system in accordance with the present invention which is designated generally by reference numeral 10. Drive system 10 comprises an input shaft 12, a housing assembly 14, a clutch assembly 16, a brake assembly 18 and an output shaft 20.

Input shaft 12 is driven at one end 30 at a specified speed by a motor (not shown) or by other drive means. The drive means can be connected to input shaft 12 by various means known well in the art. In the embodiment shown in FIG. 1, end 30 of input shaft 12 is provided with a female spline 32 to facilitate connection to the driving means. Input shaft 12 is rotatably disposed within housing assembly 14 by a roller bearing 34. The end of input shaft 12 opposite to drive end 30 extends axially into housing assembly 14 and defines a cup-shaped housing 36. Housing 36 has a hollow cylindrical section 38 supported at one end thereof by an annular wall 40 which extends between input shaft 12 and cylindrical section 38 such that cylindrical section 38 is generally coaxial with and rotatably supported by input shaft 12. The interior surface of cylindrical section 38 is adapted with a plurality of axially extending splines 42 which support a plurality of driving clutch friction plates 44 which form a portion of clutch assembly 16 as will be discussed later herein.

Housing assembly 14 comprises a fan housing 46, a clutch control housing 48, a central housing 50 and a brake control housing 52. Fan housing 46 is generally cylindrical in shape and has a single end wall 54 which partially defines an internal cavity 56. End wall 54 has a cylindrical opening 58 provided therein to allow access to input shaft 12 by the drive means. Disposed radially outward from opening 58 are a plurality of circumferentially spaced mounting holes 60 for securing fan housing 46 to the drive means. The end of fan housing 46 opposite to end wall 54 is adapted to be fixedly secured to clutch control housing 48. Disposed within interior cavity 56 is a fan 62 which is fixedly mounted to input shaft 12 for rotation therewith. Fan housing 46 further has a plurality of air inlet apertures 64 which allow for the passage of cooling air being pumped by fan 62.

Clutch control housing 46 is an annular shaped housing adapted to be fixedly secured to fan housing 46 by a plurality of circumferentially spaced mounting bolts 66 which are threadingly received in a plurality of mating threaded holes. Disposed radially inward from the plurality of mounting bolts 66 are a plurality of threaded holes 68 which receive a plurality of assembly rods 70. Rods 70 are utilized to maintain the integrity of drive system 10 as will be discussed later herein. The end of control housing 48 opposite to mounting bolts 66 is adapted to be fixedly and sealingly attached to central housing 50. Control housing 48 completes the formation of interior cavity 56 and defines a centrally located bore 72 which allows access for input shaft 12 to extend into housing assembly 14. Bore 72 defines an inner cylindrical surface 74 which supports a bearing seal housing 76 which in turn supports roller bearing 34. The interface between fan housing 46 and control housing 48 defines a plurality of air outlet apertures 78 which allow for passage of cooling air being pumped by fan 62. Air outlet apertures 78 cooperate with air inlet apertures 60 to create a path for the air pumped by fan 62 to flow across drive system 10 to aid in the cooling of drive system 10. Bearing seal housing 76 is adapted to be fixedly and sealingly attached to control housing 48 by a retaining plate 80 and a plurality of circumferentially spaced bolts 82. A seal 84 is located between bearing seal housing 76 and inner cylindrical surface 74. Retaining plate 80 locates and retains seal housing 76 and also locates and secures an additional seal 86 disposed between retaining plate 80 and input shaft 12. Seal 86 rides against input shaft 12 and operates in conjunction with seal 84 to seal the oil disposed within drive system 10 as will be described later herein.

Disposed within clutch control housing 48 is a clutch coil cavity 88 which is located in the end of clutch control housing 48 adjacent to central housing 50. Disposed within clutch coil cavity 88 is an AC voltage clutch coil 90. A plurality of circumferentially spaced spring bores 92 extend completely through control housing 48 and are located in control housing 48 radially outward from coil cavity 88. Disposed within each of the plurality of spring bores 92 is a coil spring 94 and an access bolt 96 for providing access to spring 92 in order to change to a higher or lower rated spring without disassembling drive system 10.

Clutch assembly 16 is positioned coaxial with input shaft 12 and comprises cup shaped housing 36 of input shaft 12, an annular clutch pressure plate 100, an inner hub 102, the plurality of driving clutch friction plates 44, a plurality of driven clutch friction plates 104, a clutch reaction plate 106 and a clutch actuator 108. Inner hub 102 is positioned coaxially within cup shaped housing 36 and is fixedly secured to output shaft 20 for rotation therewith. Inner hub 102 provides the inner hub for both clutch assembly 16 and brake assembly 18 as will be described later herein. The exterior surface of inner hub 102 defines a plurality of splines 110 for engagement with the plurality of driven clutch friction plates 104. Clutch reaction plate 106 is rotatably supported on inner hub 102 by a roller bearing 112. Disposed between clutch reaction plate 106 and clutch actuator 108 are the plurality of driving clutch friction plates 44 and the plurality of driven clutch friction plates 104. The plurality of driving clutch plates 44 are interleaved with the plurality of driven clutch plates 104. Driven plates 104 are splined on their interior to be drivingly connected to spline 110 on hub 102.

Annular clutch pressure plate 100 is supported by a plurality of circumferentially spaced pins 114 which are fixedly secured to clutch control housing 48. Annular clutch pressure plate 100 is axially movable along pins 114 to move clutch assembly 16 between an engaged and a disengaged condition. Extending axially from clutch pressure plate 100 in a direction away from control housing 48 is an integral hub 116 which is adapted on its exterior surface for supporting a roller bearing 120. Roller bearing 120 rollingly supports clutch actuator 108.

Clutch actuator 108 comprises a support ring 122, a plurality of actuating pins 124 and an actuator ring 126. Support ring 122 is rollingly supported by roller bearing 120. The plurality of actuating pins 124 are circumferentially spaced around and are threadingly received in support ring 122. Actuating pins 124 extend through corresponding apertures 128 disposed through annular wall 40 of cup shaped housing 36. Actuating ring 126 has a plurality of splines 130 on its exterior surface adapted for splined engagement with splines 42 of housing 36. Actuating ring 126 is positioned such that driving plates 44 and driven plates 104 are positioned between actuating ring 126 and reaction plate 106.

The plurality of coil springs 94 urge pressure plate 100 and clutch actuator 108 to the right as shown in FIG. 1. Support ring 122 pushes actuating pins 124 which in turn push actuating ring 126 to the right as shown in FIG. 1. In this position, clutch assembly 16 is in the engaged condition due to the force applied by springs 94 which sandwich driving plates 44 and driven plates 104 between actuating ring 126 and reaction plate 106. Driving friction plates 144 being splined to housing 36 of input shaft 12 and driven friction plates 104 being splined to inner hub 102 of output shaft 20 thus lock input shaft 12 to output shaft 20. Upon activation of AC voltage clutch coil 90, pressure plate 100 and clutch actuator 108 are magnetically attracted to clutch control housing 48 and these components move axially along pins 114 to the left as shown in FIG. 1. The magnetic attraction of AC voltage clutch coil 90 overcomes the spring force of the plurality of coil springs 94 and clutch assembly 16 is disengaged thus releasing input shaft 12 from output shaft 20. When the power to AC voltage clutch coil 90 is terminated, the plurality of coil springs 94 urge clutch pressure plate 100 and clutch actuator 108 to the right along pins 114 as shown in FIG. 1, again engaging clutch assembly 16 and locking input shaft 12 to output shaft 20.

Inner hub 102 extends between clutch assembly 16 and brake assembly 18 and is secured to output shaft 20 as detailed above. Brake assembly 18 comprises inner hub 102, a plurality of drive brake friction plates 140, a plurality of stationary brake friction plates 142, a brake outer housing 144 and a brake pressure plate 146. Inner hub 102 is rotatably supported relative to brake outer housing 144 by a roller bearing 150. Roller bearing 150 is positioned adjacent to roller bearing 112 and is spaced from roller bearing 112 by a spacer 152. Inner hub 102 further has a second exterior spline 154 for rotatably supporting brake driven friction plates 140. Friction plates 140 are splined on their interior surface to engage external spline 154 of inner hub 102. The plurality of stationary brake friction plates 142 are interleaved with the plurality of driven brake plates 140 and are splined on their exterior surface to mate with outer housing 144.

Outer housing 144 comprises a brake reaction member 160, an annular reaction housing 162 and annular brake pressure plate 146. Brake reaction member 160 locates roller bearing 150 and is fixedly secured to reaction housing 162 by a plurality of circumferentially spaced bolts 164. Bolts 164 extend through reaction member 160 and are threadingly received in corresponding threaded holes located in reaction housing 162. Reaction housing 162 has an internal surface which defines a plurality of axially extending splines 166. Splines 166 are adapted for engagement with the splines on the exterior surface of the plurality of stationary brake friction plates 142 for prohibiting the rotational movement of brake friction plates 142. Reaction housing 162 is fixedly secured to brake control housing 52 by a plurality of circumferentially spaced bolts 170. Disposed between reaction housing 162 and brake control housing 52 is annular brake pressure plate 146.

Annular brake pressure plate 146 has an annular activation member 174 extending axially from it towards brake reaction member 160. Activation member 174 is splined on its exterior to mate with splines 166 of reaction housing 162 similar to the splines of the plurality of stationary brake friction plates 142. The plurality of stationary brake friction plates 142 and the plurality of driven brake friction plates 140 are interleaved between activation member 174 and reaction member 160.

Brake control housing 52 forms a brake coil cavity 176 which is located on the side of control housing 52 adjacent brake 18. Disposed within brake coil cavity 176 is an AC voltage brake coil 178. A plurality of circumferentially spaced spring bores 180 extend through control housing 52 and are located radially outward from coil cavity 176. Disposed within each of the plurality of circumferentially spaced spring bores 180 is a coil spring 182 and an access bolt 184 for providing access to springs 182 in order to change to a higher or lower rated spring without disassembling drive system 10. Coil springs 182 thus bias pressure plate 146 to the left as shown in FIG. 1. In this position, brake assembly 18 is in the applied position with the plurality of driven friction plates 140 and the plurality of stationary friction plates 142 being compressed between reaction member 160 and activation member 174. Output shaft 20 is locked to housing assembly 14 due to the splined engagement of the plurality of driven brake friction plates 140 being splined to inner hub 102 and the plurality of stationary brake friction plates 140 being splined to reaction housing 162 of brake outer housing 144. Upon activation of AC voltage brake coil 178, brake pressure plate 146 and brake activation member 174 are magnetically attracted to brake control housing 52 and these components move axially to the right as shown in FIG. 1. The magnetic attraction of AC voltage brake coil 178 overcomes the spring force of the plurality of coil springs 182 and brake assembly 18 is released. Output shaft 20 is thus free to rotate relative to housing assembly 14. When the power to AC voltage brake coil 178 is terminated the plurality of coil springs 182 urge brake pressure plate 146 to the left as shown in FIG. 1 again applying brake assembly 18 and locking output shaft 20 to housing assembly 14. Brake control housing 52 further includes a plurality of circumferentially spaced holes 186 which correspond to threaded holes 68 of clutch control housing 48 and receive assembly rods 70 to maintain the integrity of drive system 10.

Central housing 50 extends between clutch control housing 48 and brake control housing 52 to define an internal chamber 188. A pair of seals 190 seal the connection between central housing 50 and control housings 48 and 52 to contain the oil disposed within chamber 188. Assembly rods 70 which are threadingly received within threaded hole 68 of control housing 48, extend over central housing 50 and through the plurality of holes 186 in control housing 52. A plurality of nuts 192 sandwich central housing 50 between control housings 48 and 52 to define sealed chamber 188.

Brake control housing 52 defines a central bore 194 which mounts roller bearing 196 for rotatingly supporting output shaft 20. Bore 194 also forms a locating surface for a bearing seal housing 198. Bearing seal housing 198 is adapted to be fixedly and sealingly attached to control housing 52 by a plurality of circumferentially spaced bolts 200 and a seal 202. Bearing seal housing 198 locates an additional seal 204 which is disposed between seal housing 198 and output shaft 20 to complete the sealing of chamber 188. Thus chamber 188 is fluidly sealed by seals 84, 86, 202, 204 and the pair of seals 190. Chamber 188 is filled with a specified quantity of oil to provide lubricant for the oil shear clutch and brake assemblies 16 and 18 as well as providing lubrication for the various components of drive system 10.

Output shaft 20 extends through pressure plate 172 and bore 194 in brake control housing 52. Output shaft 20 is rotatably supported by bearing 196 and extends axially through bearing 196 to provide for the attachment of a driven device (not shown). A flange 206 is fixedly secured to brake control housing 52 by a plurality of bolts 208 to accommodate the attachment of the driven device or apparatus using a plurality of holes 210 located within flange 206.

The operation of drive system 10 begins with no power being supplied to the drive means, clutch assembly 16 or brake assembly 18. The drive means is thus not rotating input shaft 12, clutch assembly 16 is in the engaged position and brake assembly 18 is in the applied position due to the biasing of the plurality of coil springs 94 and 182, respectively. The drive means is thus prohibited from rotating because of its attachment to input shaft 12 which is locked to output shaft 20 by the engagement of clutch assembly 16 and the locking of output shaft 20 to housing assembly 14 by the application of brake assembly 18. When power is applied to the drive means and clutch assembly 16, input shaft 12 is free to rotate with the drive means due to the disengagement of clutch assembly 16. Output shaft 20 is still in its locked position with respect to housing assembly 14 due to the application of brake assembly 18.

From the above operating position, drive system 10 can be switched to the driving state by terminating the power to clutch assembly 16 to place it in the engaged position and thus locking input shaft 12 to output shaft 20. Generally simultaneously with the termination of power to clutch assembly 16 is the application of power to brake assembly 18 to release brake 18 and allow the rotation of output shaft 20 with the rotation of input shaft 12 relative to housing assembly 14.

The braking of the drive means and the driven apparatus by drive system 10 is accomplished by terminating power to the drive means, clutch assembly 16 and brake assembly 18. Input shaft 12 and output shaft 20 are locked together by the engagement of clutch assembly 16 and output shaft 20 is locked to housing assembly 14 by application of brake 18 thus braking drive system 10.

While the above detailed description describes the preferred embodiment of the present invention, it should be understood that the present invention is susceptible to modification, variation and alteration without deviating from the scope and fair meaning of the subjoined claims.

What is claimed is:

1. A drive system for transmitting power from a drive to an apparatus, said drive system comprising:

a stationary housing;

an output member for transmitting rotation from said drive system, said output member adapted to engage said apparatus and rotatably mounted in said housing;

an input member for transmitting rotation to said drive system, said input member adapted to engage said drive and rotatably mounted in said housing;

a selectively operable brake for prohibiting rotation of said output member with respect to said housing; said brake being capable of being positioned in an applied or a released condition;

a non-rotating brake application member including a first axially movable pressure plate for positioning said brake in said applied or said released condition;

a selectively operable clutch for locking said input member to said output member, said clutch being capable of being positioned in an engaged or disengaged condition;

a non-rotating clutch engagement member including a second axially movable pressure plate for positioning said clutch in said engaged or said disengaged condition;

a first spring member for biasing said non-rotating brake application member such that said brake is normally positioned in said applied condition; and a second spring member for biasing said non-rotating clutch engagement member such that said clutch is normally positioned in said engaged condition.

2. The drive system of claim 1 further comprising a fan for moving air around said stationary housing.

3. The drive system of claim 1 wherein said output member comprises a shaft rotatably mounted in said stationary housing.

4. The drive system of claim 1 wherein said input member comprises a shaft rotatably mounted in said stationary housing.

5. The drive system of claim 1 wherein said brake comprises a plurality of interleaved first friction disks alternately splined, respectively, to said output member and said stationary housing.

6. The drive system of claim 1 wherein said clutch comprises a plurality of interleaved second friction disks alternately splined, respectively, to said input member and said output member.

7. The drive system of claim 1 wherein said non-rotating clutch engagement member is movable by an AC voltage coil such that said clutch is positioned in said disengaged position.

8. The drive system of claim 1 wherein said non-rotating brake application member is movable by an AC voltage coil such that said brake is positioned in said released condition.

9. A drive system for an apparatus, said drive system comprising:

a stationary housing;

an output shaft for transmitting rotation from said drive system, said output shaft rotatably mounted in said housing;

an input shaft for transmitting rotation to said drive system, said input shaft rotatably mounted in said housing;

a selectively operable brake for prohibiting rotation of said output shaft with respect to said housing, said brake having a plurality of interleaved first friction disks alternately splined, respectively, to said output shaft and said stationary housing and being capable of being positioned in an applied or a released condition;

a non-rotating brake application member including a first axially movable pressure plate for positioning said brake in said applied or said released condition;

a selectively operable clutch for locking said input shaft to said output shaft, said clutch having a plurality of interleaved second friction disks alternately splined, respectively, to said input shaft and said output shaft and being capable of being positioned in an engaged or disengaged condition;

a non-rotating clutch engagement member including a second axially movable pressure plate for positioning said clutch in said engaged or said disengaged condition;

a first spring member for biasing said non-rotating brake application member such that said brake is normally positioned in said applied condition; and a second spring member for biasing said non-rotating clutch engagement member such that said clutch is normally positioned in said engaged position.

10. The drive system of claim 9 further comprising a fan for moving air around said stationary housing.

11. The drive system of claim 9 wherein said non-rotating clutch engagement member is movable by an AC voltage coil such that said clutch is positioned in said disengaged condition.

12. The drive system of claim 9 wherein said non-rotating brake engagement member is movable by an AC clutch coil such that said brake is positioned in said released condition.

* * * * *